(12) United States Patent
Caprioli et al.

(10) Patent No.: US 8,993,096 B2
(45) Date of Patent: Mar. 31, 2015

(54) STRUCTURED METAL HEAT SHIELD

(75) Inventors: Davide Caprioli, Winterthur (CH); Mark Myron Melnykowycz, Winterthur (CH)

(73) Assignee: Autoneum Technologies AG, Winterhur (CH)

( * ) Notice: Subject to any disclaimer, the term of this patent is extended or adjusted under 35 U.S.C. 154(b) by 769 days.

(21) Appl. No.: 13/260,926

(22) PCT Filed: Mar. 22, 2010

(86) PCT No.: PCT/EP2010/053658
§ 371 (c)(1),
(2), (4) Date: Sep. 29, 2011

(87) PCT Pub. No.: WO2010/112354
PCT Pub. Date: Oct. 7, 2010

(65) Prior Publication Data
US 2012/0034431 A1    Feb. 9, 2012

(30) Foreign Application Priority Data

Apr. 1, 2009   (CH) ...................................... 0535/09

(51) Int. Cl.
*B32B 3/00* (2006.01)
*F16L 59/02* (2006.01)
*B60R 13/08* (2006.01)

(52) U.S. Cl.
CPC .............. *F16L 59/026* (2013.01); *F16L 59/029* (2013.01); *B60R 13/0876* (2013.01)

USPC ........................... 428/172; 428/156; 428/187

(58) Field of Classification Search
USPC .......................... 428/156, 167, 172, 187, 600
See application file for complete search history.

(56) References Cited

U.S. PATENT DOCUMENTS 5,792,539 A    8/1998   Hunter

FOREIGN PATENT DOCUMENTS

DE      202006019984 U1 *  8/2007
EP          1 985 439 A1    10/2008

OTHER PUBLICATIONS

English translation of DE 20 2006 019 984 U1, published Aug. 23, 2007.*

* cited by examiner

*Primary Examiner* — Catherine A Simone
(74) *Attorney, Agent, or Firm* — Finnegan, Henderson, Farabow, Garrett & Dunner, L.L.P.

(57) ABSTRACT

A heat shield for a vehicle comprising at least one layer of a 3D structured metal sheet with a plurality of indentations or embossments, wherein the embossments protrude in a common direction normal to the surface of the sheet material, defined as the neutral plane n. The embossments also protrude a first distance h away from this neutral plane and together form a regular network, where each embossment forms a junction by intersecting with at least two other embossments.

20 Claims, 7 Drawing Sheets

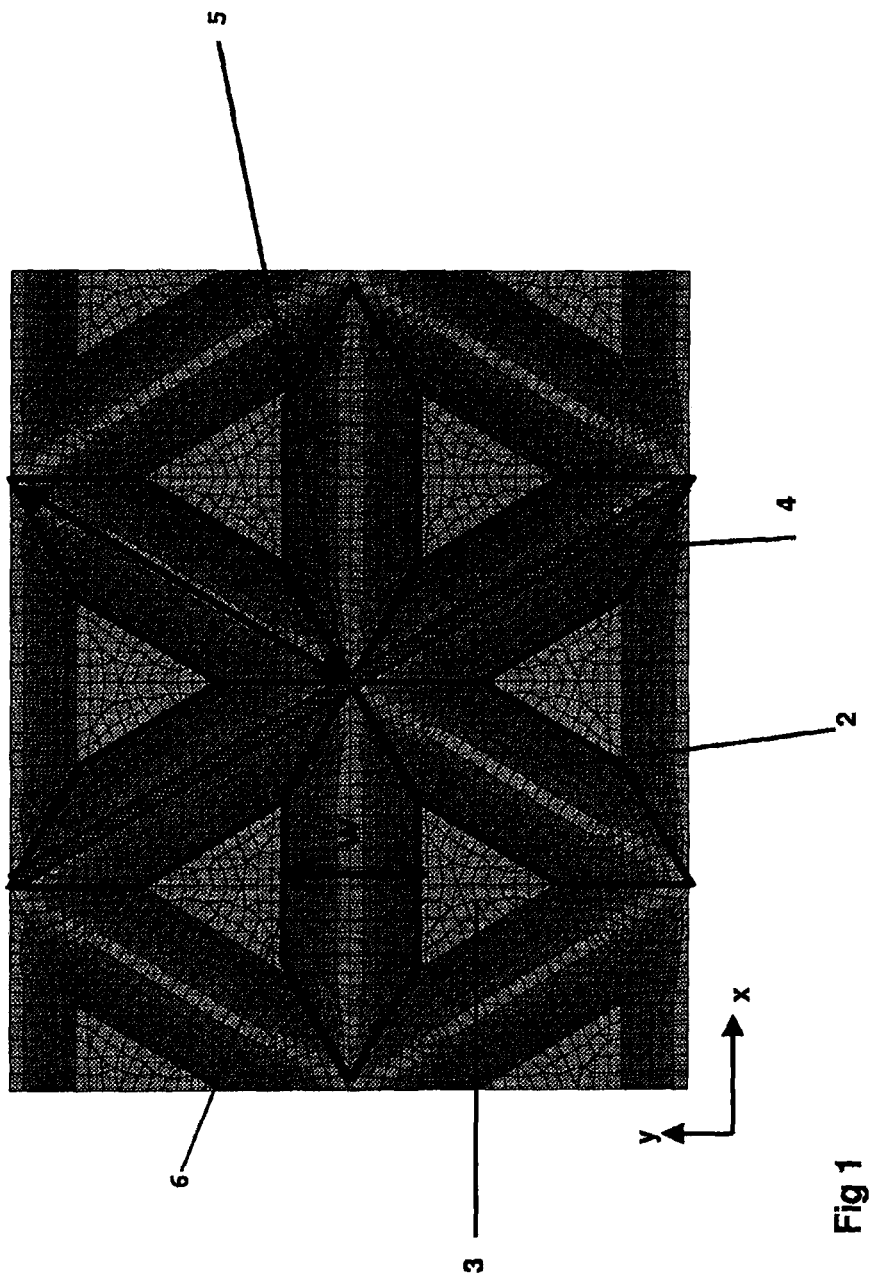

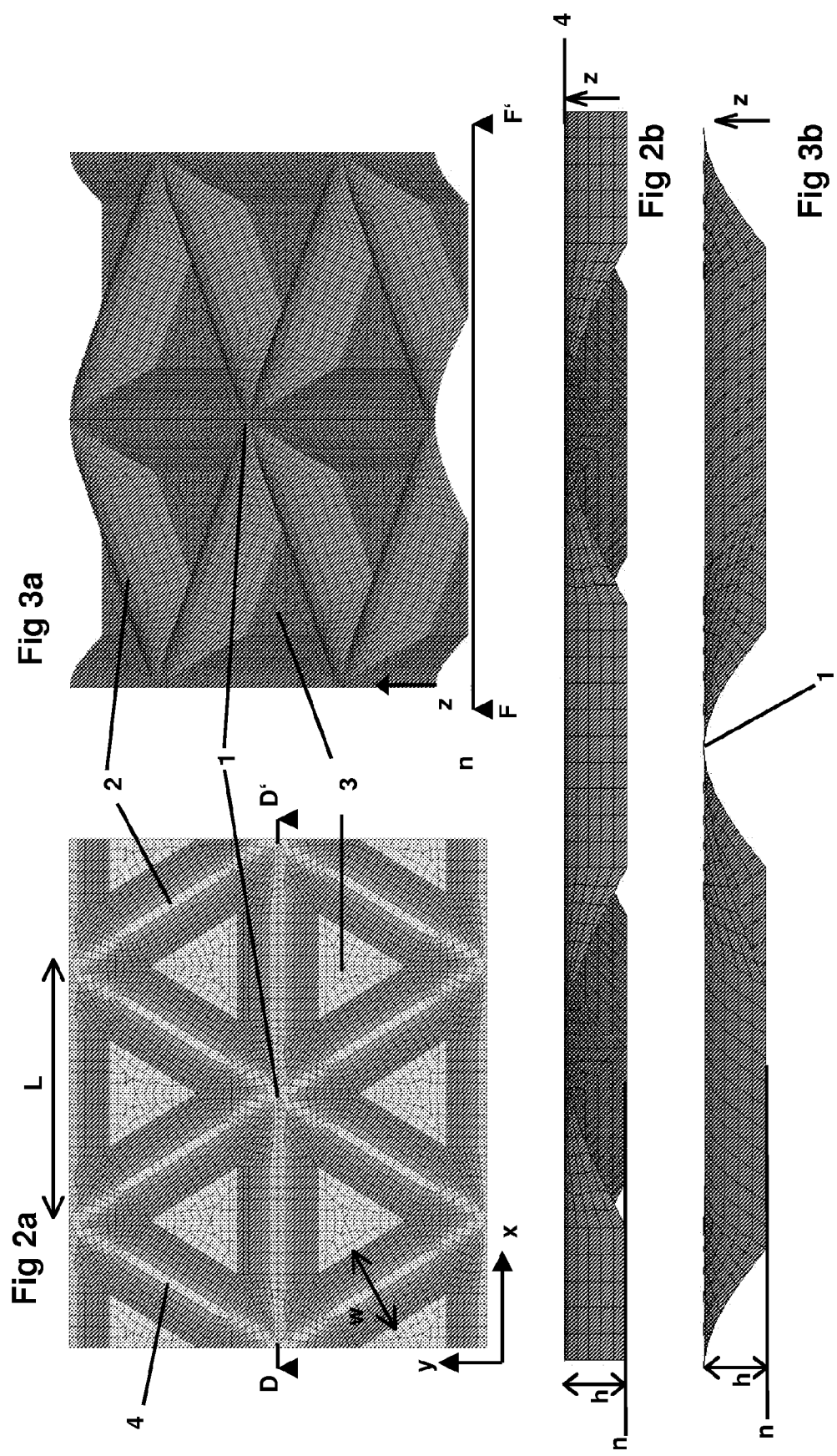

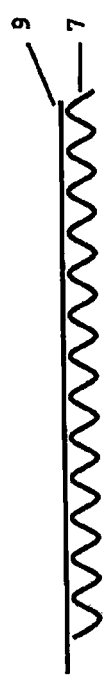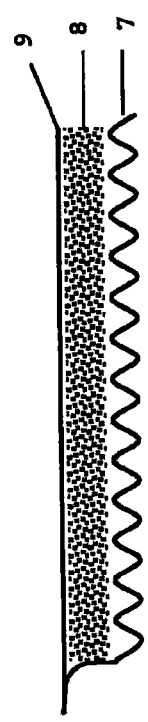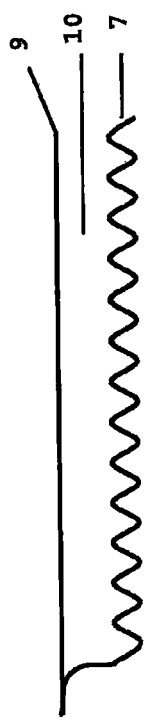
Fig 5 A  Fig 5 B  Fig 5 C  Fig 5 D

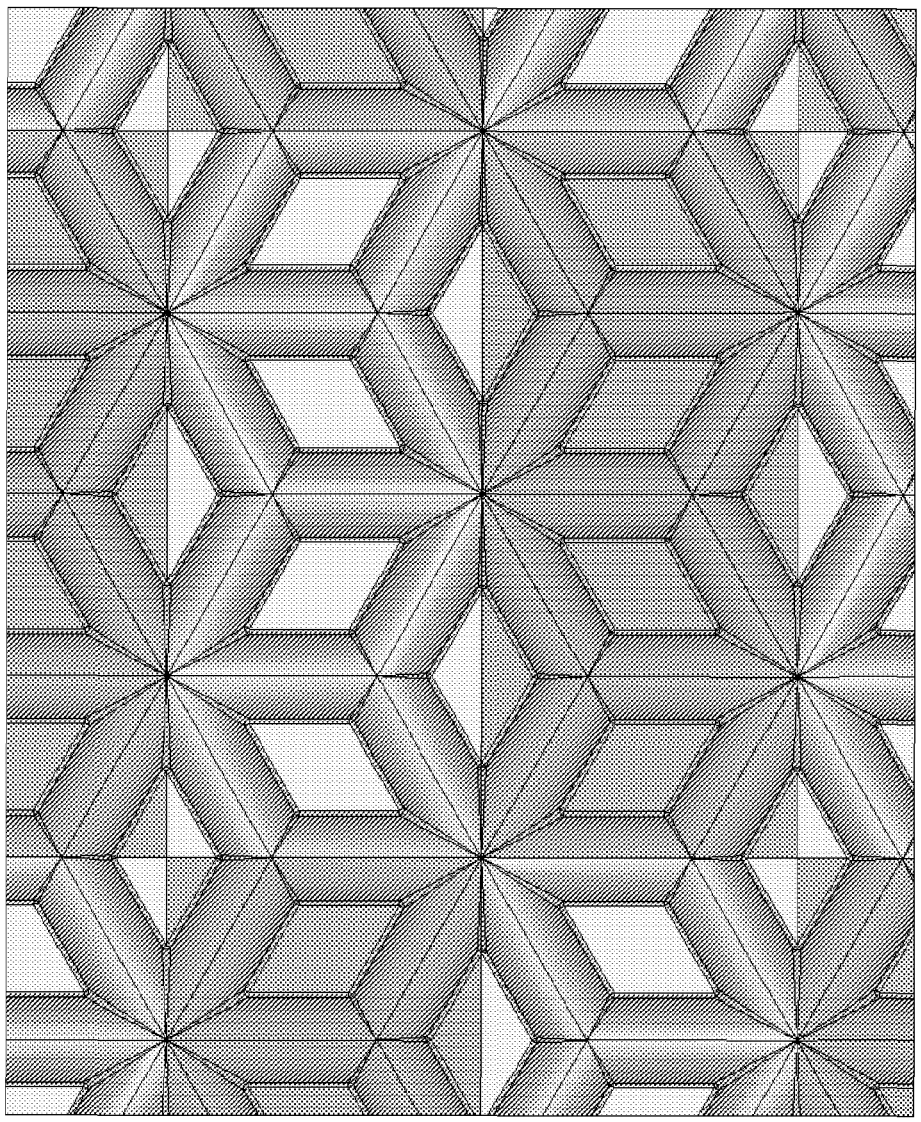
Fig 8

STRUCTURED METAL HEAT SHIELD

CROSS REFERENCE TO RELATED APPLICATIONS

This application is a national phase application under 35 U.S.C. 371 based on International Application No. PCT/EP2010/053658, filed Mar. 22, 2010, which claims the priority of Swiss Patent Application No. 00535/009, filed Apr. 1, 2009, the entire content of both of which is hereby incorporated by reference.

FIELD

The disclosure is directed to a 3D structured metal sheet for heat shields and a heat shield used in the automotive and truck industry.

BACKGROUND

In automotive production, there is a significant demand for lightweight construction using metal sheet components. The use of thinner sheets is essential in achieving weight reduction. However, serious problems can occur during forming of metal sheet components with thinner sheets since the rigidity of the formed part decreases as sheet thickness decreases. Moreover, the formability of the formed part also decreases with decreasing sheet thickness.

Increasing metal sheet component rigidity while reducing weight can be achieved by substituting steel with aluminium, magnesium, or titanium alloys; or by using a three-dimensional (3D) structured metal sheet. The 3D structured sheet enhances the mechanical properties of components primarily by increasing bending stiffness because of increased inertia (the higher the inertia of the component, the stiffer the sheet). Strain hardening, which occurs during the structuring process, also improves the rigidity of the component.

A 3D structured metal sheet is defined as a sheet of metal with a raised relief from the surface of the metal sheet, such as an embossment. Raising the surface into these bosses or protuberances can be achieved, for instance, by application of pressure against a die roller cut. Another form of making a relief pattern into a sheet of metal is by indentation whereby small surface depressions are made by striking or pressing. In the following description, the terms "embossing" and "embossment" are used for both the process and product of indentation and embossment.

3D structured metal sheet can be produced by rolling, between two rollers with at least one roller having a surface in the form of the desired 3D structure, by embossing between two press plates, or by hydro forming. Rolling is a continuous process and pressing can only be run in a semi-continuous process. These processes normally create high strain-hardening.

Heat shields are classically made from metal sheet material, mainly steel, alloys, or aluminium, the material being used for a supporting sheet, a cover sheet and for insulation. However, other materials like glass fibre, felt material, and special plastic and mineral foams can be used against high temperatures and noise, particularly as the insulation material. For instance, U.S. Pat. No. 5,901,428 discloses examples of 3D structured sheets used in a heat shield. The 3D structure is in the form of pyramidal points formed by embossed dimples, and the so formed sheet is used in a stack of structured sheets to form a heat shield barrier with stand-offs to form air pockets. US 2006/0194025 discloses another example of a multi-layer heat shield with complementary contours or dimples formed in adjacent layers. The dimples are formed with a stamping die.

To increase the effectiveness of the heat shield and reduce the space required for the shield, the metal sheet or stack of sheets may be contoured to closely resemble the shape of the outer surface of, for instance, the exhaust manifold. To provide the desired contour in a metal sheet, the resulting outer metal layer of a heat shield typically includes a number of wrinkles. These wrinkles not only reduce the aesthetic appearance, they are also the place where the fatigue of the product can be observed first.

Most of the known 3D structure patterns used today are made of a repeated single form. U.S. Pat. No. 6,966,402 discloses a pattern with a plurality of dimples formed in a geometric shape selected from a group consisting of a spherical shape, a pyramidal shape, a conical shape, and a trapezoidal shape, and where the dimples are distributed in an offset, uniform rows and columns, or in a random pattern. EP 0 439 046 discloses a 3D pattern in the form of a diamond shaped cross-hatching pattern, which allows the sheet to be stretched and compressed as needed. Also the use of wrinkling or dimpling is disclosed, for instance a plurality of creases or ridges such as in the shape of corrugations. U.S. Pat. No. 6,821,607 discloses the use of knobs having a draped or folded type structure which increases the compression resistance for the individual knobs and therefore, increases the bending strength of the entire sheet of material.

In order to form the embossments for each of the above-noted patterns, the material is stretched around a dimple placed as a stand-alone feature in the overall pattern. By this stretching, material is displaced away from the neutral plane of the flat metal sheet adding to the bending rigidity. If the dimples are placed close enough to each other, then the material between the dimples will be partly offset compared to a neutral plane of the flat metal sheet. That is, the flanks of the embossments will start overlapping. However, the peak of the dimple will always form the highest offset point. Due to the common embossing patterns used and the chosen dimple form, the bending rigidity is optimized in one or two directions of the plane at the expense of other directions in the same plane, for instance, by forming unwanted bending lines, e.g., lines where the metal sheet becomes very easy to bend.

SUMMARY

The present disclosure is thus directed to obtaining a 3D structured metal sheet with increased bending stiffness in a plurality of directions of the plane of the sheet such that the bending stiffness of the 3D structured metal sheet is substantially more equal or uniform in all directions.

According to one example implementation, a 3D structured metal sheet, for use in automotive heat shields, may include a plurality of indentations or embossments. All of the embossments protrude towards the same direction normal to the surface of the plain sheet material, defined as the neutral plane n. The embossments also protrude essentially by the same distance h away from this neutral plane n. Moreover, the plurality of embossments together form a regular network, whereby essentially each embossment intersects with at least two other embossments to form a junction.

A regular network is defined as a regular repeating pattern of embossments connected to each other to form a raised network or pattern above the surface of the metal sheet.

The thus formed 3D structured metal sheet may have increased bending properties in multiple directions of the plane of the sheet. This is due to the network formed and to the intersection of the embossments, by forming junctions. These junctions increase the bending stiffness of possible bending lines. Therefore, according to the example embodiments, it is feasible to use thinner sheets of metal thereby reducing material weight and cost in the final product.

The 3D structural sheet with the pattern according to the disclosure may be used in single heat shields as well as in multi-layer heat shields. The heat shields themselves can be formed to correspond to the contours of the source of the heat, for example, a motor, engine exhaust, or an under-floor of a vehicle. In such an embodiment, the 3D structured metal sheet may be curved, wherein the neutral surface may correspond to the curved surface.

Additional objects and advantages of the disclosed embodiments will be set forth in part in the description which follows, and in part will be obvious from the description, or may be learned by practice of the disclosed embodiments. The objects and advantages of the present disclosure will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate embodiments of the invention and together with the description, serve to explain the principles of the present disclosure. In the drawings:

FIG. 1 Schematic example of a 3D structure according to the invention;

FIG. 2a Schematic example of the 3D structure according to the invention—view from the top;

FIG. 2b Side view D-D' from FIG. 1;

FIG. 3a Schematic example of the 3D structure according to the invention—slightly tilted 3D view;

FIG. 3b Side view F-F' from FIG. 2;

FIG. 5a Schematic drawing of a single shell heat shield;

FIG. 5b-d Schematic drawing of a double shell heat shield;

FIG. 8 Example of a network with varying numbers of embossments converging at a junction.

DETAILED DESCRIPTION

Figure 4B:
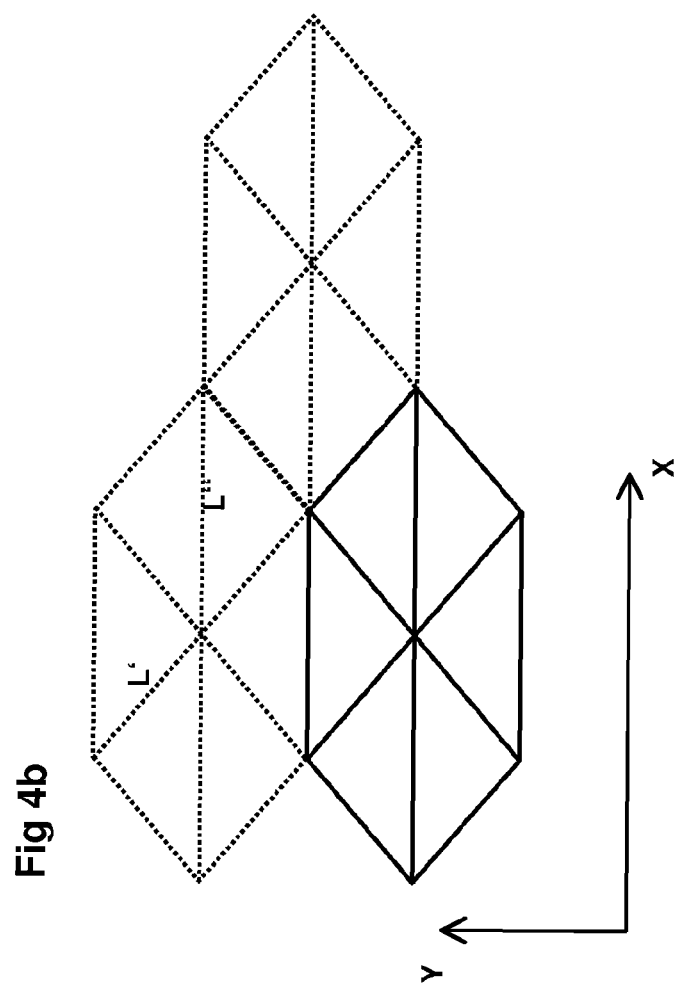
FIG. 4b Example of a network with 6 embossments intersecting in each junction with a stretched pattern in the direction of the x-ax.

FIG. 1 illustrates a schematic drawing of an example of the 3D structure according to the disclosure. This figure is used to explain and define the overall parameters of the pattern according to the disclosure generally and without limitation to the specific network shown.

As shown, an embossment 2 may be in the form of an elongated shape, whereby a raised area 4 of the embossment 2 is essentially parallel to a neutral plane n of the metal sheet. As shown, the raised area 4 extends a maximum distance h away from the neutral plane n. The embossment 2 thus formed includes an undersurface 1 shaped as a hollow tunnel (see FIGS. 2b and 3b), with height h, forming the backbone of a network of embossments 2. The form of the undersurface 1 may be rounded or elliptic.

Each embossment 2 may be connected to two or more adjacent embossments 2 at a junction 5. The distance between any two adjacent junctions 5 may be defined by a length L of the embossment 2. Embossment 2 can be a rounded, straight, or curved. As shown in FIG. 1, interconnection of embossments 2 via junctions 5 may form an overall network of embossments 2 over the surface of the metal sheet.

The width w may be defined as the longest distance between sidewalls 6 of each embossment 2, whereby the sidewalls 6 are displaced material between the raised area 4 of the embossment 2 and nonraised material remaining on the neutral plane n (e.g., triangle 3 in FIG. 1).

Figure 6:
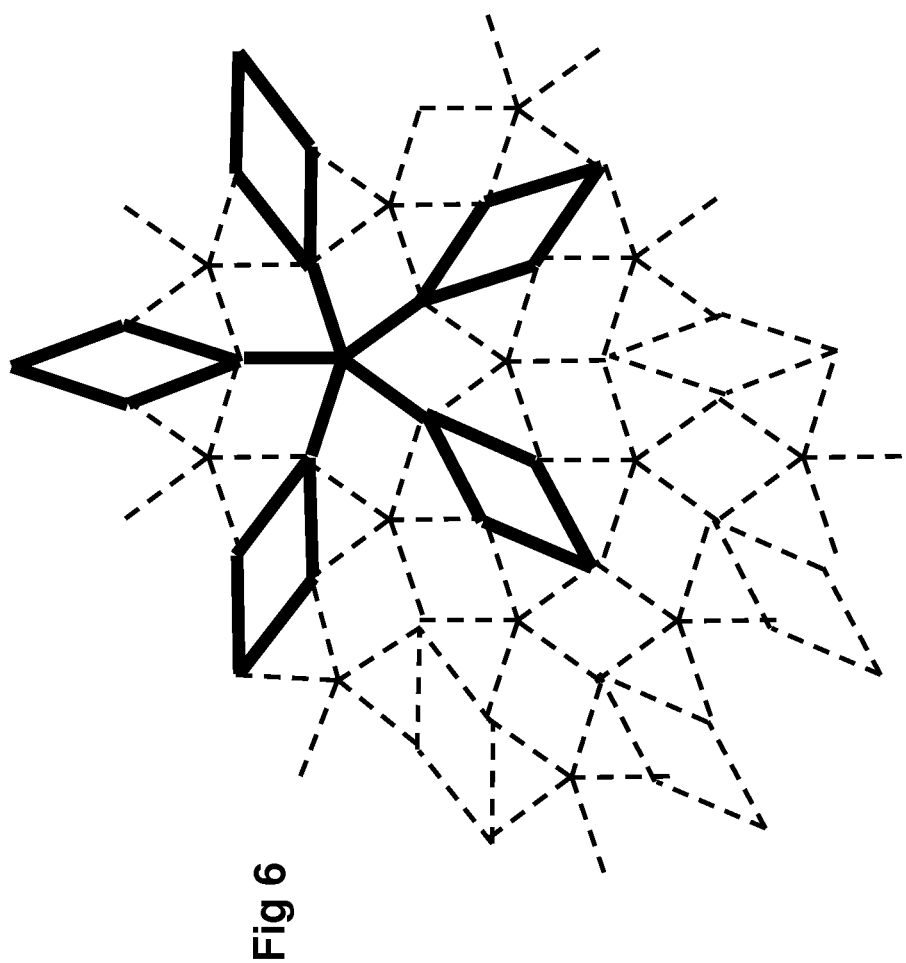
FIG. 6-7 Schematic examples of other networks according to the invention.
Figure 7:
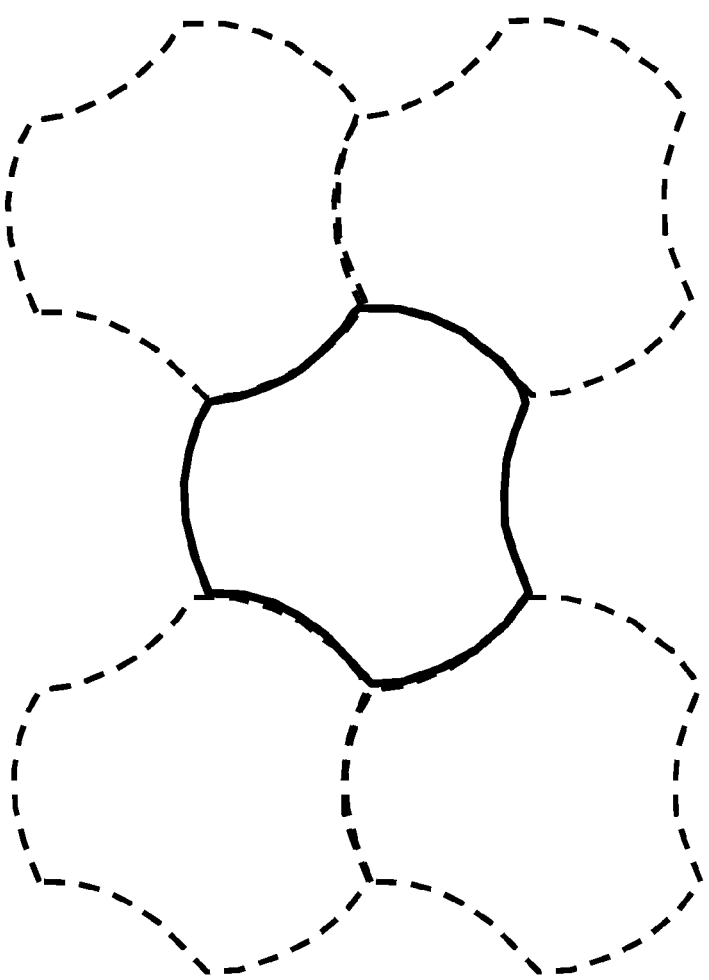

To form a network, it is not necessary that the embossments 2 be all the same. It is also feasible to form a regular network with embossments 2 of different lengths L and/or with different shapes. It is also in the scope of the disclosure to obtain a regular network whereby the number of embossments 2 converging in a junction 5 may vary. Top views of examples of different network configurations are illustrated in FIGS. 6 and 7.

Figure 4A:
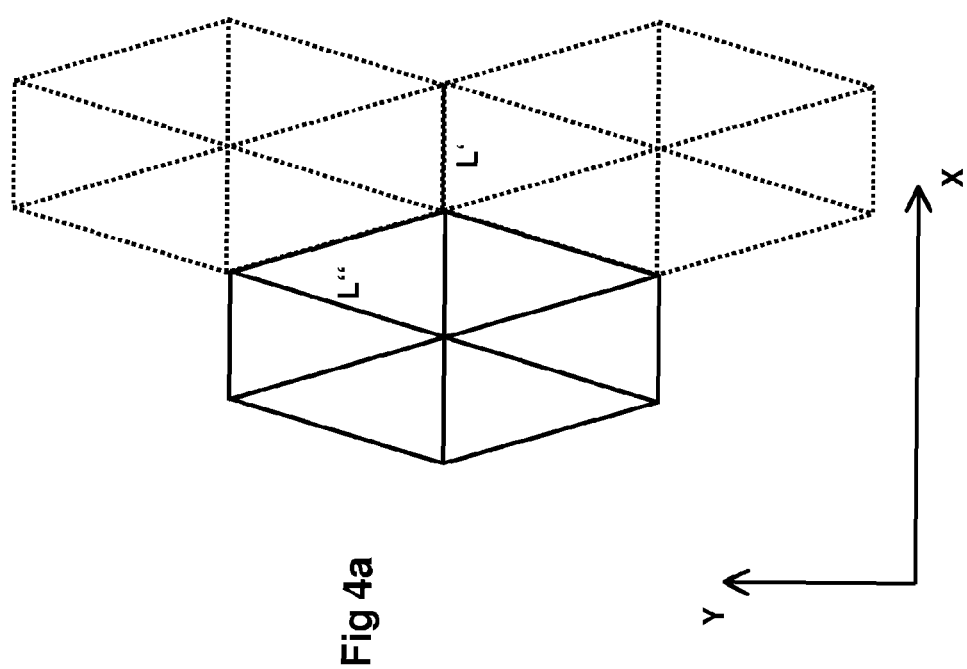
FIG. 4a Example of a network with 6 embossments intersecting in each junction with a stretched pattern in the direction of the y-ax.

Preferably, the distance L between any two adjacent junctions 5 within the network is equal. However, a network stretched in at least one direction of the plane is possible, whereby the distance L" between two adjacent junctions 5 lying predominantly in the stretched direction, is longer than the distance L' between two adjacent junctions 5 in the non-stretched direction. (See FIGS. 4a and 4b).

Returning to FIGS. 1, 2a, and 2b, these figures illustrate schematic examples of a 3D structured metal sheet according to the description. The x- and y-directions are in the neutral plane n of the metal sheet. The z-direction extends out of, e.g., normal to, the neutral plane n of a plain sheet. The 3D structured metal sheet may be formed, for example, either by embossing or by indentations.

The embossments 2 intersect at junctions 5 thereby forming a continuous 3D network on the surface of the metal sheet. These embossments 2 each extend, in the same direction a maximum distance h from the neutral plane n in the z-direction. The maximum distance h is defined as the distance between the undersurface 1 of the embossments 2 and the neutral plane n.

Preferably the length L of each of the embossments 2 is such that adjacent junctions 5 are symmetrically interspersed between each other.

As shown in FIG. 6, for example, a regular pattern of embossments 2 intersect in adjacent junctions 5. As such, each junction 5 may connect six embossments 2. However, each junction 5 may connect, for example, three, four, five, seven, eight or more embossments 2. By using six embossments 2 intersecting at each junction 5, an imaginary isosceles triangle 3 is formed between every three embossments 2. The material of these triangles 3 is positioned along the neutral plane n, meaning that essentially no movement of material took place during the 3D structuring of the metal sheet in these areas.

In comparison to the state-of-the-art dimple pattern, where the material is stretched, thereby forming a thinned layer of material at the top of the dimple which can easily crack, the material in the structured metal sheet according to the disclosure is displaced to the top of the network structure. Particularly at the center of the junctions 5, where the embossments 2 converge, the most material can be found. This contributes to increased stiffness and better fatigue behavior found in the sheet metal according to the disclosure. The shaded colors in FIGS. 1-3 illustrate the material distribution in the final product, whereby the darker color indicates a thinner area.

Depending on the number of embossments 2 intersecting at a junction 5, other patterns of non-raised material can be formed. In the example in FIG. 4a, the number of embossments intersecting in each junction 5 is three, and the non-raised material is hexagonal in shape. Also, other patterns forming a 3D network structured metal sheet, whereby the network is formed by embossments 2, fall within the scope of the disclosure (see FIG. 6). FIG. 8, for example, illustrates another example of a pattern according to the disclosure whereby junctions 5 connect varying numbers of embossments. For example, each junction 5 may connect either three or six embossments 2. Such a configuration will increase the stiffness as well as the evenness of the stiffness in different directions of the plane. At the same time, if a crack occurs, it is not able to propagate to a large crack as may happen with embossments according to the state of the art.

In the state of the art, single dimple forms are raised and the network is not or is only partly raised. An inverse embossment according to the disclosure may, however, be created. By using this inverse pattern according to the disclosure, more material is moved from the neutral plane n to a raised plane, e.g., raised area 4. This leads to localized strain hardening due to forming and provides an improved nucleation resistance, as well as an overall increase in bending stiffness in different directions. Additionally, due to the 3D structure network formed by multi-directional embossments 2, direct crack propagation in the metal sheet may be inhibited.

The actual length, width and height of the embossments 2 may depend on the thickness of the sheet before embossing and the bending stiffness and tensile strength to be achieved. Preferably the length L is much larger than the width w and the height h of the embossments 2.

If the same patterning die is used, the width w of the embossments 2 may increase with increased thickness, due to increased amounts of material moved to these areas.

The design of the heat shield varies according to the required function and the construction space in each area of a vehicle in which the heat shield will be employed. This space is normally up to several mm, for instance 2 to 3 mm. The 3D structured metal sheet according to the disclosure can be used, for example, as a single shell heat shield (FIG. 5a) where it forms a supporting sheet 7. Insulation 8 may be attached to this single shell heat shield with a sealing foil. A single shell heat shield can have the edge crimped (not shown) for reinforcing the outer contour and enhancing the handling of parts during production and vehicle assembly. Furthermore, the material can be formed to correspond to the contours of the object to be protected, such as, for example, a motor or exhaust-system. The 3D structured metal sheet with the embossed network according to the disclosure may also be used in double shell heat shields (FIGS. 5b-d). Double shell heat shields may be made of a supporting sheet 7 and a cover sheet 9 with a form of insulation 8 sandwiched between the two sheets. The cover sheet 9 serves to attach the insulation 8 and increases the stiffness of the component. The insulation 8 may also be in the form of an air gap 10.

Double shell heat shields are typically crimped (not shown), to fix the insulation 8 and/or 10 between the cover sheet 9 and the supporting sheet 7. Depending on the function of the double shell heat shield, the supporting sheet 7 and/or the cover sheet 9 can be a 3D structured metal sheet according to the disclosure. Additionally, a stack of at least two layers of the structured metal sheet according to the disclosure may be used as a heat shield.

Preferably the structured metal sheet according to the disclosure is only partially and/or locally embossed to obtain areas of increased stiffness, where needed, keeping other areas for bending into the form of the heat shield desired.

Preferably the structured metal sheet according to the disclosure is only partially and/or locally perforated with either macro perforations or micro perforations. Perforated heat shields are known in the art and are used, for instance, in multi-layer heat shields used for acoustic insulation.

All directions referenced herein are to be understood merely for explanation of the network pattern formed, and not in any way limiting of the process of producing the disclosed structured sheet metal material.

3D structured metal according to the disclosure can be produced with the standard processes according to the state of the art. In particular, the sheet can be produced by rolling between 2 rollers with at least one roller having a surface in the form of the desired 3D structure, by embossing between two press plates (e.g., linear embossing), or by hydro forming. Rolling is a continuous process and pressing can only be run in a semi-continuous process. These processes normally create high strain hardening.

Other embodiments will be apparent to those skilled in the art from consideration of the specification and practice of the disclosed method and apparatus. It is intended that the specification and examples be considered as exemplary only, with a true scope and spirit of the invention being indicated by the following claims.

The invention claimed is:

1. A heat shield, comprising:
a material sheet longitudinally extending along a plane and having a plurality of embossments thereon;
wherein each of the plurality of embossments protrude, in a common direction normal to the plane, a first distance from the material sheet, wherein the plurality of embossments define a regular network of embossments, wherein each of the plurality of embossments forms at least a portion of a respective junction by intersecting with at least two other embossments of the plurality of embossments, and wherein the number of the plurality of embossments that intersect to form a respective junction varies throughout the regular network of embossments.

2. The heat shield of claim 1, wherein the distance between any two adjacent junctions of the regular network of embossments is equal to the distance between any other two adjacent junctions of the regular network of embossments.

3. The heat shield of claim 1, wherein each embossment of the plurality of embossments is elongate.

4. The heat shield of claim 1, wherein each of the plurality of embossments forms the junction by intersecting with at least three other embossments.

5. The heat shield of claim 1, wherein each of the plurality of embossments forms the junction by intersecting with at least six other embossments.

6. The heat shield of claim 1, wherein the regular network of embossments includes at least one sot of junction at which three embossments intersect and at least one junction at which six embossments intersect.

7. The heat shield of claim 1, wherein a maximum thickness of the material sheet is defined by a thickness of the material sheet at each respective junction of the intersecting embossments.

8. The heat shield of claim 1, wherein the material sheet is partially covered with the regular network of embossments.

9. The heat shield of claim 1, further comprising:
a cover sheet; and an insulation layer disposed between the material sheet and the cover layer.

10. A heat shield, comprising:
a material sheet longitudinally extending along a plane and having a plurality of embossments thereon;
wherein each of the plurality of embossments protrude, in a common direction normal to the plane, a first distance from the material sheet, wherein the plurality of embossments define a regular network of embossments interconnected at junctions, wherein a maximum thickness of the material sheet is defined by a thickness of the material sheet at the junctions of the interconnected embossments within the regular network, and wherein the number of the plurality of embossments that intersect to form a respective junction varies throughout the regular network of embossments.

11. The heat shield of claim 10, wherein each embossment forms at least a portion of a respective junction by intersecting with at least two other embossments of the plurality of embossments.

12. The heat shield of claim 10, wherein the material sheet is partially covered with the regular network of embossments.

13. The heat shield of claim 10, further comprising:
a cover sheet; and
an insulation layer disposed between the material sheet and the cover layer.

14. A heat shield, comprising:
a material sheet longitudinally extending along a plane and having a plurality of embossments thereon;
wherein each of the plurality of embossments protrude, in a common direction normal to the plane, a first distance from the material sheet, wherein the plurality of embossments define a regular network of embossments interconnected at junctions, and wherein the number of embossments of the plurality of embossments which intersect to form a respective junction varies throughout the regular network of embossments.

15. The heat shield of claim 14, wherein the regular network of embossments includes at least one junction at which three embossments intersect and at least one junction at which six embossments intersect.

16. The heat shield of claim 14, wherein a thickness of the material sheet is greatest at a point on each of the embossments of the plurality of embossments farthest from the plane.

17. The heat shield of claim 14, further comprising:
a cover sheet; and
an insulation layer disposed between the material sheet and the cover layer.

18. The heat shield of claim 14, wherein each of the plurality of embossments forms at least a portion of a respective, unction by intersecting with at least two other embossments of the plurality of embossments.

19. The heat shield of claim 10, wherein the regular network of embossments includes at least one junction at which three embossments intersect and at least one junction at which six embossments intersect.

20. The heat shield of claim 14, wherein the distance between any two adjacent junctions of the regular network of embossments is equal to the distance between any other two adjacent junctions of the regular network of embossments.

* * * * *

UNITED STATES PATENT AND TRADEMARK OFFICE
CERTIFICATE OF CORRECTION

PATENT NO. : 8,993,096 B2
APPLICATION NO. : 13/260926
DATED : March 31, 2015
INVENTOR(S) : Davide Caprioli et al.

Page 1 of 1

It is certified that error appears in the above-identified patent and that said Letters Patent is hereby corrected as shown below:

IN THE CLAIMS

Claim 6, col. 6, line 57, "at least one sot of junction" should read --at least one junction--.

Claim 18, col. 8, lines 19-20, "a respective, unction" should read --a respective junction--.

Signed and Sealed this
Ninth Day of February, 2016

Michelle K. Lee
*Director of the United States Patent and Trademark Office*